US012647171B2

(12) United States Patent
Zhou et al.

(10) Patent No.: US 12,647,171 B2
(45) Date of Patent: Jun. 2, 2026

(54) BEAM HANDOVER METHOD, APPARATUS, AND COMMUNICATIONS DEVICE

(71) Applicant: HUAWEI TECHNOLOGIES CO., LTD., Shenzhen (CN)

(72) Inventors: Jianwei Zhou, Hangzhou (CN); Yunfei Qiao, Hangzhou (CN); Hejia Luo, Hangzhou (CN); Chenlei Xu, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 497 days.

(21) Appl. No.: 17/707,642

(22) Filed: Mar. 29, 2022

(65) Prior Publication Data

US 2022/0224405 A1 Jul. 14, 2022

Related U.S. Application Data

(63) Continuation of application No. PCT/CN2020/115380, filed on Sep. 15, 2020.

(30) Foreign Application Priority Data

Sep. 30, 2019 (CN) .......................... 201910945733.5

(51) Int. Cl.
H04B 7/06 (2006.01)
H04B 7/185 (2006.01)
(Continued)

(52) U.S. Cl.
CPC ..... H04B 7/06952 (2023.05); H04B 7/18513 (2013.01); H04W 36/00837 (2018.08); H04W 36/322 (2023.05)

(58) Field of Classification Search
CPC ............ H04B 7/18513; H04B 7/18541; H04B 7/2041; H04B 7/0695; H04W 84/06;
(Continued)

(56) References Cited

U.S. PATENT DOCUMENTS

2014/0213312 A1 7/2014 Yeh et al.
2017/0127332 A1 5/2017 Axmon et al.
(Continued)

FOREIGN PATENT DOCUMENTS

CN 102957461 A 3/2013
CN 107370698 A 11/2017
(Continued)

OTHER PUBLICATIONS

Nokia et al., "Considerations on Doppler Compensation; Uplink Timing Advance and Random Access in NTN," 3GPP TSG RAN WG1 Meeting #98, R1-1908250, Prague, Czech Republic, Aug. 26-30, 2019, 22 pages.
(Continued)

*Primary Examiner* — Yu-Wen Chang
(74) *Attorney, Agent, or Firm* — Fish & Richardson P.C.

(57) ABSTRACT

The present disclosure relates to beam handover methods, apparatuses, and communications devices. In one example method, a terminal device receives first indication information sent by a network device, where the first indication information includes a first parameter value of a first beam, and the first parameter value is a compensation amount of a frequency offset of the first beam generated by relative motion between the terminal device and the network device. The terminal device calculates a receive frequency or a transmit frequency of the first beam based on the first parameter value.

20 Claims, 4 Drawing Sheets

(51) Int. Cl.
 *H04W 36/00* (2009.01)
 *H04W 36/32* (2009.01)
(58) Field of Classification Search
 CPC ......... H04W 36/00837; H04W 36/322; H04W
 56/0035; H04W 24/04; H04W 72/0453;
 H04W 72/23
 See application file for complete search history.

(56) References Cited

U.S. PATENT DOCUMENTS

| 2019/0007126 | A1 | 1/2019 | Regunathan et al. | |
|---|---|---|---|---|
| 2019/0261425 | A1 | 8/2019 | Park et al. | |
| 2019/0342907 | A1* | 11/2019 | Huang | H04W 72/23 |
| 2020/0313755 | A1* | 10/2020 | Chuang | H04L 5/0048 |
| 2021/0006328 | A1* | 1/2021 | Kim | H04W 72/23 |
| 2021/0273699 | A1* | 9/2021 | Cao | H04B 7/088 |
| 2022/0038139 | A1* | 2/2022 | Eriksson Löwenmark | |
| | | | | H04B 7/01 |
| 2022/0159741 | A1* | 5/2022 | Hoang | H04W 72/0453 |
| 2022/0173799 | A1* | 6/2022 | Wigard | H04B 7/18513 |
| 2022/0286198 | A1* | 9/2022 | Khan | H04W 56/0045 |
| 2022/0360320 | A1* | 11/2022 | Miao | H04W 56/0035 |
| 2022/0368401 | A1* | 11/2022 | Yang | H04B 7/0695 |
| 2024/0155592 | A1* | 5/2024 | Ma | H04L 5/0092 |
| 2024/0340755 | A1* | 10/2024 | Sedin | H04W 36/249 |

FOREIGN PATENT DOCUMENTS

| CN | 108432318 | A | 8/2018 |
|---|---|---|---|
| CN | 109219931 | A | 1/2019 |
| CN | 109845370 | A | 6/2019 |
| CN | 109889460 | A | 6/2019 |
| CN | 110168962 | A | 8/2019 |
| EP | 0728385 | B1 | 5/2006 |
| IN | 108476057 | A | 8/2018 |

OTHER PUBLICATIONS

Thales, "Considerations on Doppler Shift and Doppler Pre-Post Compensation Mechanism," 3GPP TSG RAN WG1 Meeting #98, R1-1908229, Prague, Czech Republic, Aug. 26-30, 2019, 16 pages.
Extended European Search Report in European Appln No. 20872014. 4, dated Sep. 23, 2022, 12 pages.
Ericsson, "On feasibility of Doppler compensation on DLTX in Bidirectional SFN," 3GPP TSG RAN WG4 Meeting #77, R4-157809, Anaheim, USA, Nov. 16-20, 2015, 4 pages.
LG Electronics, "Discussion on transmit beam coordination and QCL for NR," 3GPP TSG RAN WG1 Meeting #86, R1-166903, Gothenburg, Sweden, Aug. 22-26, 2016, 5 pages.
Office Action issued in Chinese Application No. 201910945733.5 on Jul. 5, 2022, 15 pages (with English translation).
PCT International Search Report and Written Opinion issued in International Application No. PCT/CN2020/115380 on Dec. 15, 2020, 16 pages (with English translation).
Yanhua, "Doppler Shift Calculation and Compensation Study in Mobile Satellite Communication System," Master Thesis of Dalian University of Technology, 2014, 14 pages (with English translation).

* cited by examiner

200

BEAM HANDOVER METHOD, APPARATUS, AND COMMUNICATIONS DEVICE

CROSS-REFERENCE TO RELATED APPLICATIONS

This application is a continuation of International Application No. PCT/CN2020/115380, filed on Sep. 15, 2020, which claims priority to Chinese Patent Application No. 201910945733.5, filed on Sep. 30, 2019. The disclosures of the aforementioned applications are hereby incorporated by reference in their entireties.

TECHNICAL FIELD

This application relates to the communications field, and more specifically, to a beam handover method, an apparatus, and a communications device.

BACKGROUND

A 5th generation mobile communications system and a future evolved system not only need to meet a plurality of service requirements, but also need to provide wider service coverage. Because satellite communication is less affected by a geographical condition and can implement global coverage, development of satellite communication is of great significance. In particular, satellite communication can provide a strong communication guarantee for emergency and disaster releasing when a basic communications facility is seriously damaged by a natural disaster and normal communication cannot be performed. In addition, in some areas that are not conducive to setting up a ground base station, including a sea, a desert, a mountain, and the like, effective communication may be performed through satellite communication, to ensure full coverage of communication. Therefore, in discussions on a 5th generation (5th generation, 5G) system in the 3rd generation partnership project (3rd generation partnership project, 3GPP) protocol, a satellite is used as a new access device.

However, in addition to a satellite in a synchronous orbit satellite system, a satellite in another type of satellite system has a moving speed relative to the ground, and a lower orbital altitude indicates a larger relative speed. Relative to a terminal device, the moving speed of the satellite is relatively large, so that a relatively large Doppler shift is generated. For example, when a satellite altitude is 600 km, a beam diameter is 200 km, and a center frequency is 3.5 GHz, a maximum Doppler shift is about ±80 kHz. This seriously affects downlink synchronization and frequency offset estimation performance, and for a capability of an existing terminal, downlink synchronization cannot be performed. Currently, Doppler pre-compensation is performed on a downlink beam and Doppler post-compensation is performed on uplink beam data mostly at a satellite side based on beam locations. However, a main problem caused by performing Doppler compensation at the satellite side is that the terminal device cannot obtain transceiver frequency hopping between beams. Consequently, when the terminal device is handed over from one beam to another beam, the terminal device cannot determine a receive or transmit frequency of a target beam to which the terminal device is handed over, resulting in communication interruption or disconnection after beam handover.

SUMMARY

This application provides a beam handover method, to effectively avoid communication interruption caused by inter-beam frequency hopping when a terminal device performs beam handover, and ensure communication reliability.

According to a first aspect, a beam handover method is provided. The method may be performed by a terminal device or a module (for example, a chip) disposed in a terminal device. The following uses an example in which the method is performed by a terminal device for description.

The method includes: A terminal device receives first indication information sent by a network device, where the first indication information includes a first parameter value of a first beam, and the first parameter value is a compensation amount of a frequency offset that is of the first beam and that is generated by relative motion between the terminal device and the network device; and the terminal device calculates a receive frequency of the first beam based on the first parameter value, or the terminal device calculates a transmit frequency of the first beam based on the first parameter value. Optionally, the first parameter value is a compensation amount of a frequency offset generated when the terminal device is handed over to the first beam.

According to the solution of this application, the network device (for example, a satellite base station) indicates, to the terminal device, a compensation value that is used by the satellite base station to compensate for a beam frequency offset caused by relative motion between a satellite and the terminal device on the ground, so that the terminal device can accurately calculate, after beam handover, a transmit frequency of a transmit beam to which the terminal device is to be handed over or a receive frequency of a receive beam to which the terminal device is to be handed over, thereby avoiding communication interruption caused by inter-beam frequency hopping, and improving communication reliability.

With reference to the first aspect, in some implementations of the first aspect, the first indication information is carried in bandwidth resource configuration information.

By way of example instead of limitation, the bandwidth resource configuration information is configuration information used to configure a general parameter for a bandwidth part.

By way of example instead of limitation, the bandwidth resource configuration information is configuration information used to configure a cell-specific common parameter for a bandwidth part.

By way of example instead of limitation, the bandwidth resource configuration information is configuration information used to configure a UE-specific parameter for a bandwidth part.

According to the solution of this application, in addition to a bandwidth, a compensation mount corresponding to a beam used to transmit data carried in the bandwidth is also configured in the bandwidth resource configuration information, so that after the terminal device is handed over to the beam used by the bandwidth, the terminal device can determine, by using the first indication information carried in the bandwidth configuration information, a receive or transmit frequency of the beam used by the bandwidth, thereby avoiding communication interruption caused by inter-beam frequency hopping, and improving communication reliability.

With reference to the first aspect, in some implementations of the first aspect, the first indication information is carried in measurement configuration information.

According to the solution of this application, a compensation amount of a beam of a neighbor cell is configured by using the measurement configuration information, so that after the terminal device is handed over to the beam of the neighbor cell, the terminal device can obtain a receive frequency of the beam of the neighbor cell, or a transmit frequency of a transmit beam used by the terminal device in the neighbor cell, thereby avoiding communication interruption caused by inter-beam frequency hopping, and improving communication reliability.

With reference to the first aspect, in some implementations of the first aspect, the first indication information specifically indicates a normalized value of the first parameter value.

According to the solution of this application, the network device indicates a normalized value of the compensation amount, to reduce signaling overheads when indication precision for the first parameter value is ensured.

By way of example instead of limitation, the normalized value of the first parameter value is calculated by using the first parameter value, a normalization factor, and a multiple factor, and an expression is:

$$f_{p\_compressed}=F(f_p/f_{compress}\times\alpha)$$

$f_p$ is the first parameter value, $f_{compress}$ is the normalization factor, $f_{p\_compressed}$ is the normalized value of the first parameter value, $\alpha$ is the multiple factor, and represents rounding x.

By way of example instead of limitation, the multiple factor is preset by a system or specified in a protocol.

With reference to the first aspect, in some implementations of the first aspect, the first indication information specifically indicates an index value of the first parameter value.

With reference to the first aspect, in some implementations of the first aspect, the first indication information further includes information used to indicate the multiple factor $\alpha$.

With reference to the first aspect, in some implementations of the first aspect, the method further includes:

The terminal device receives second indication information sent by the network device, where the second indication information is used to indicate a second parameter value of a second beam, the second beam is a beam currently used by the terminal device for communication, and the first beam is a beam to which the terminal device is to be handed over.

That the terminal device calculates a receive frequency of the first beam based on the first parameter value includes:

The terminal device calculates the receive frequency of the first beam based on the first parameter value and the second parameter value.

Alternatively, that the terminal device calculates a transmit frequency of the first beam based on the first parameter value includes:

The terminal device calculates the transmit frequency of the first beam based on the first parameter value and the second parameter value.

According to the solution of this application, a receive frequency or a transmit frequency of a beam to which the terminal device is handed over is calculated based on a second parameter value of a current communications beam and a first parameter value of the beam to which the terminal device is to be handed over, to improve precision that the terminal device calculates the receive frequency or the transmit frequency.

According to a second aspect, a beam handover method is provided. The method may be performed by a network device or a module (for example, a chip) disposed in a network device. The following uses an example in which the method is performed by a network device for description.

The method includes: A network device determines a first parameter value, where the first parameter value is a compensation amount of a frequency offset that is of a first beam and that is generated by relative motion between a terminal device and the network device; and the network device sends first indication information to the terminal device, where the first indication information includes information used to indicate the first parameter value of the first beam, and the first parameter value is used by the terminal device to calculate a receive frequency of the first beam, or the first parameter value is used by the terminal device to calculate a transmit frequency of the first beam.

With reference to the second aspect, in some implementations of the second aspect, the first indication information is carried in bandwidth resource configuration information.

With reference to the second aspect, in some implementations of the second aspect, the bandwidth resource configuration information is configuration information used to configure a general parameter for a bandwidth part.

With reference to the second aspect, in some implementations of the second aspect, the bandwidth resource configuration information is configuration information used to configure a cell-specific common parameter for a bandwidth part.

With reference to the second aspect, in some implementations of the second aspect, the bandwidth resource configuration information is configuration information used to configure a UE-specific parameter for a bandwidth part.

With reference to the second aspect, in some implementations of the second aspect, the first indication information is carried in measurement configuration information.

With reference to the second aspect, in some implementations of the second aspect, the first indication information specifically indicates a normalized value of the first parameter value.

With reference to the second aspect, in some implementations of the second aspect, the normalized value of the first parameter value is calculated by using the first parameter value, a normalization factor, and a multiple factor, and an expression is:

$$f_{p\_compressed}=F(f_p/f_{compress}\times\alpha)$$

$f_p$ is the first parameter value, $f_{compress}$ is the normalization factor, $f_{p\_compressed}$ is the normalized value of the first parameter value, $\alpha$ is the multiple factor, and $F(x)$ represents rounding x.

With reference to the second aspect, in some implementations of the second aspect, the first indication information specifically indicates an index value of the first parameter value.

With reference to the second aspect, in some implementations of the second aspect, the first indication information further includes information used to indicate the multiple factor $\alpha$.

With reference to the second aspect, in some implementations of the second aspect, the method further includes:

The network device sends second indication information to the terminal device, where the second indication information is used to indicate a second parameter value of a second beam, the second beam is a beam currently used by the terminal device for communication, and the first beam is a beam to which the terminal device is to be handed over.

That the terminal device calculates a receive frequency of the first beam based on the first parameter value includes:

The terminal device calculates the receive frequency of the first beam based on the first parameter value and the second parameter value.

Alternatively, that the terminal device calculates a transmit frequency of the first beam based on the first parameter value includes:

The terminal device calculates the transmit frequency of the first beam based on the first parameter value and the second parameter value.

According to a third aspect, a communications apparatus is provided. The apparatus may be disposed in or is a terminal device. The communications apparatus includes: a transceiver unit, configured to receive first indication information sent by a network device, where the first indication information includes information used to indicate a first parameter value of a first beam, and the first parameter value is a compensation amount of a frequency offset that is of the first beam and that is generated by relative motion between the terminal device and the network device; and a processing unit, configured to calculate a receive frequency of the first beam based on the first parameter value, or configured to calculate a transmit frequency of the first beam based on the first parameter value.

With reference to the third aspect, in some implementations of the third aspect, the first indication information is carried in bandwidth resource configuration information.

With reference to the third aspect, in some implementations of the third aspect, the bandwidth resource configuration information is configuration information used to configure a general parameter for a bandwidth part.

With reference to the third aspect, in some implementations of the third aspect, the bandwidth resource configuration information is configuration information used to configure a cell-specific common parameter for a bandwidth part.

With reference to the third aspect, in some implementations of the third aspect, the bandwidth resource configuration information is configuration information used to configure a UE-specific parameter for a bandwidth part.

With reference to the third aspect, in some implementations of the third aspect, the first indication information is carried in measurement configuration information.

With reference to the third aspect, in some implementations of the third aspect, the first indication information specifically indicates a normalized value of the first parameter value.

With reference to the third aspect, in some implementations of the third aspect, the normalized value of the first parameter value is calculated by using the first parameter value, a normalization factor, and a multiple factor, and an expression is:

$$f_{p\_compressed} = F(f_p/f_{compress} \times \alpha)$$

$f_p$ is the first parameter value, $f_{compress}$ is the normalization factor, $f_{p\_compressed}$ is the normalized value of the first parameter value, $\alpha$ is the multiple factor, and $F(x)$ represents rounding x.

With reference to the third aspect, in some implementations of the third aspect, the first indication information specifically indicates an index value of the first parameter value.

With reference to the third aspect, in some implementations of the third aspect, the first indication information further includes information used to indicate the multiple factor $\alpha$.

With reference to the third aspect, in some implementations of the third aspect, the transceiver unit is further configured to receive second indication information sent by the network device, where the second indication information is used to indicate a second parameter value of a second beam, the second beam is a beam currently used by the terminal device for communication, and the first beam is a beam to which the terminal device is to be handed over.

That the processing unit calculates a receive frequency of the first beam based on the first parameter value includes:

The processing unit calculates the receive frequency of the first beam based on the first parameter value and the second parameter value.

Alternatively, that the processing unit calculates a transmit frequency of the first beam based on the first parameter value includes:

The processing unit calculates the transmit frequency of the first beam based on the first parameter value and the second parameter value.

Optionally, the communications apparatus further includes a storage unit, and the processing unit is coupled to the storage unit. The processing unit may be configured to execute instructions in the storage unit, to implement the method according to any one of the first aspect and the possible implementations of the first aspect. Optionally, the communications apparatus further includes a communications interface, and the processing unit is coupled to the communications interface.

In an implementation, the communications apparatus is a terminal device. When the communications apparatus is a terminal device, the communications interface may be a transceiver unit or an input/output interface.

In another implementation, the communications apparatus is a chip disposed in a network device. When the communications apparatus is a chip disposed in a network device, the communications interface may be an input/output interface.

Optionally, the transceiver unit may be a transceiver circuit. Optionally, the processing unit may be a logic circuit. Optionally, the input/output interface may be an input/output circuit.

According to a fourth aspect, a communications apparatus is provided. The apparatus may be disposed in or is a network device. The communications apparatus includes: a processing unit, configured to determine a first parameter value, where the first parameter value is a compensation amount of a frequency offset that is of a first beam and that is generated by relative motion between a terminal device and the network device; and a transceiver unit, configured to send first indication information to the terminal device, where the first indication information includes information used to indicate the first parameter value of the first beam, and the first parameter value is used by the terminal device to calculate a receive frequency of the first beam, or the first parameter value is used by the terminal device to calculate a transmit frequency of the first beam.

With reference to the fourth aspect, in some implementations of the fourth aspect, the first indication information is carried in bandwidth resource configuration information.

With reference to the fourth aspect, in some implementations of the fourth aspect, the bandwidth resource configuration information is configuration information used to configure a general parameter for a bandwidth part.

With reference to the fourth aspect, in some implementations of the fourth aspect, the bandwidth resource configuration information is configuration information used to configure a cell-specific common parameter for a bandwidth part.

With reference to the fourth aspect, in some implementations of the fourth aspect, the bandwidth resource configuration information is configuration information used to configure a UE-specific parameter for a bandwidth part.

With reference to the fourth aspect, in some implementations of the fourth aspect, the first indication information is carried in measurement configuration information.

With reference to the fourth aspect, in some implementations of the fourth aspect, the first indication information specifically indicates a normalized value of the first parameter value.

With reference to the fourth aspect, in some implementations of the fourth aspect, the normalized value of the first parameter value is calculated by using the first parameter value, a normalization factor, and a multiple factor, and an expression is:

$$f_{p\_compressed}=F(f_p/f_{compress}\times\alpha)$$

$f_p$ is the first parameter value, $f_{compress}$ is the normalization factor, $f_{p\_compressed}$ is the normalized value of the first parameter value, $\alpha$ is the multiple factor, and $F(x)$ represents rounding x.

With reference to the fourth aspect, in some implementations of the fourth aspect, the first indication information specifically indicates an index value of the first parameter value.

With reference to the fourth aspect, in some implementations of the fourth aspect, the first indication information further includes information used to indicate the multiple factor $\alpha$.

With reference to the fourth aspect, in some implementations of the fourth aspect, the transceiver unit is further configured to send second indication information to the terminal device, where the second indication information is used to indicate a second parameter value of a second beam, the second beam is a beam currently used by the terminal device for communication, and the first beam is a beam to which the terminal device is to be handed over.

That the processing unit calculates a receive frequency of the first beam based on the first parameter value includes:

The processing unit calculates the receive frequency of the first beam based on the first parameter value and the second parameter value.

Alternatively, that the processing unit calculates a transmit frequency of the first beam based on the first parameter value includes:

The processing unit calculates the transmit frequency of the first beam based on the first parameter value and the second parameter value.

Optionally, the communications apparatus further includes a storage unit, and the processing unit is coupled to the storage unit. The processing unit may be configured to execute instructions in the storage unit, to implement the method according to any one of the second aspect and the possible implementations of the second aspect. Optionally, the communications apparatus further includes a communications interface, and the processing unit is coupled to the communications interface.

In an implementation, the communications apparatus is a network device. When the communications apparatus is a network device, the communications interface may be a transceiver unit or an input/output interface.

In another implementation, the communications apparatus is a chip disposed in a network device. When the communications apparatus is a chip disposed in a network device, the communications interface may be an input/output interface.

Optionally, the transceiver unit may be a transceiver circuit. Optionally, the processing unit may be a logic circuit. Optionally, the input/output interface may be an input/output circuit.

According to a fifth aspect, a processor is provided. The processor includes an input circuit, an output circuit, and a processing circuit. The processing circuit is configured to: receive a signal through the input circuit, and transmit a signal through the output circuit, to enable the processor to perform the method according to any one of the first aspect and the second aspect and the possible implementations of the first aspect and the second aspect.

In a specific implementation process, the processor may be one or more chips, the input circuit may be an input pin, the output circuit may be an output pin, and the processing circuit may be a transistor, a gate circuit, a trigger, various logic circuits, and the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in this embodiment of this application.

According to a sixth aspect, a processing apparatus is provided. The processing apparatus includes a processor and a memory. The processor is configured to read instructions stored in the memory, and may receive a signal through a receiver, and transmit a signal through a transmitter, to perform the method according to any one of the first aspect and the second aspect and the possible implementations of the first aspect and the second aspect.

Optionally, there are one or more processors, and there are one or more memories.

Optionally, the memory may be integrated with the processor, or the memory and the processor may be separately disposed.

In a specific implementation process, the memory may be a non-transitory (non-transitory) memory, for example, a read-only memory (read-only memory, ROM). The memory and the processor may be integrated into one chip, or may be separately disposed in different chips. A type of the memory and a manner of disposing the memory and the processor are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus in the sixth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a seventh aspect, a computer program product is provided. The computer program product includes a computer program (which may also be referred to as code or instructions). When the computer program is run, a computer is enabled to perform the method according to any one of the first aspect and the second aspect and the possible implementations of the first aspect and the second aspect.

According to an eighth aspect, a computer-readable medium is provided. The computer-readable medium stores a computer program (which may also be referred to as code or instructions). When the computer program is run on a computer, the computer is enabled to perform the method according to any one of the first aspect and the second aspect and the possible implementations of the first aspect and the second aspect.

According to a ninth aspect, a communications system is provided. The communications system includes the foregoing network device and the foregoing terminal device.

DESCRIPTION OF EMBODIMENTS

The following describes technical solutions of this application with reference to accompanying drawings.

Figure 1:
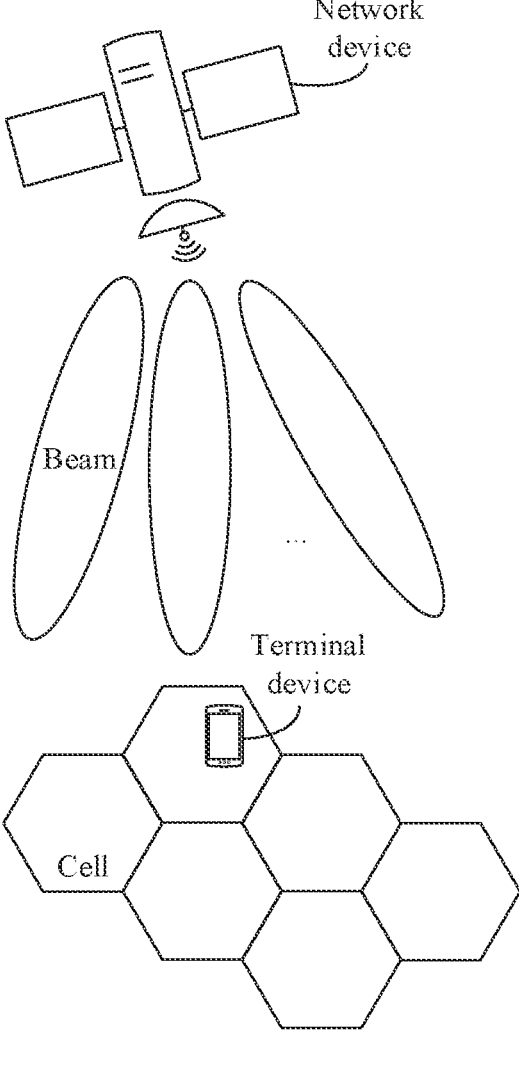
FIG. 1 is a schematic diagram of a satellite communications system to which this application is applicable.

The technical solutions of this application may be applied to a satellite communications system. FIG. 1 is a schematic architectural diagram of a satellite communications system. The satellite communications system 100 may include at least one network device 101, that is, a satellite base station is used as a network device in this application. The satellite communications system 100 may include at least one terminal device 102. The satellite base station may communicate with the terminal device in a serving cell of the satellite base station by using a beamforming technology. The satellite communications system may also be referred to as a non-terrestrial communications (non-terrestrial network, NTN) system.

In some satellite communications systems, a space segment of the satellite communications system may be a multi-layer structure including a management satellite and one or more serving satellites. In networking of the satellite communications system having the multi-layer structure, the space segment may include one or more management satellites and serving satellites managed by these management satellites. The satellite or satellite base station mentioned in this application is not limited to a management satellite or a serving satellite.

The technical solutions in embodiments of this application may be applied to various communications systems such as a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS)

system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a future 5th generation (5th generation, 5G) system or a new radio (new radio, NR) system, a vehicle-to-X (Vehicle-to-X, V2X) system, a long term evolution-vehicle (Long Term Evolution-Vehicle, LTE-V) system, an internet of vehicles system, a machine type communication (machine type communication, MTC) system, an internet of things (Internet of Things, IoT) system, a long term evolution-machine (Long Term Evolution-Machine, LTE-M) system, and a machine to machine (Machine to Machine, M2M), where V2X may include vehicle to network (vehicle to network, V2N), vehicle to vehicle (vehicle to-Vehicle, V2V), vehicle to infrastructure (vehicle to infrastructure, V2I), vehicle to pedestrian (vehicle to pedestrian, V2P), and the like.

In the embodiments of this application, the network device may be any device having a wireless transceiver function. The device includes but is not limited to an evolved NodeB (evolved Node B, eNB), a radio network controller (Radio Network Controller, RNC), a NodeB (Node B, NB), a base station controller (Base Station Controller, BSC), a base transceiver station (Base Transceiver Station, BTS), a home base station (for example, a Home evolved NodeB, or a Home Node B, HNB), a baseband unit (BaseBand Unit, BBU), an access point (Access Point, AP) in a wireless fidelity (Wireless Fidelity, Wi-Fi) system, a wireless relay node, a wireless backhaul node, a transmission point (transmission point, TP), a transmission reception point (transmission and reception point, TRP), or the like. Alternatively, the device may be a gNB or a transmission point (TRP or TP) in a 5G (for example, NR) system, one antenna panel or a group of antenna panels (including a plurality of antenna panels) of a base station in a 5G system. Alternatively, the device may be a network node, such as a baseband unit (BBU) or a distributed unit (distributed unit, DU), that constitutes a gNB or a transmission point.

In some deployments, the gNB may include a centralized unit (centralized unit, CU) and a DU. The gNB may further include an active antenna unit (active antenna unit, AAU for short). The CU implements some functions of the gNB, and the DU implements some functions of the gNB. For example, the CU is responsible for processing a non-real-time protocol and a non-real-time service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (radio access network, RAN), or may be classified as a network device in a core network (core network, CN). This is not limited in this application.

The terminal device in the embodiments of this application needs to access a mobile satellite communications network by using the ground segment of the satellite communications system to perform mobile communication. The terminal device may also be referred to as user equipment (user equipment, UE), an access terminal, a subscriber unit, a subscriber station, a mobile station, a remote station, a remote terminal, a mobile device, a user terminal, a terminal, a wireless communications device, a user agent, or a user apparatus. The terminal device in the embodiments of this application may be a mobile phone (mobile phone), a pad (pad), a computer with a wireless transceiver function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in smart grid (smart grid), a wireless terminal in transportation safety (transportation safety), a wireless terminal in smart city (smart city), a wireless terminal in smart home (smart home), a cellular phone, a cordless telephone set, a session initiation protocol (session initiation protocol, SIP) phone, a wireless local loop (wireless local loop, WLL) station, a personal digital assistant (personal digital assistant, PDA), a hand-held device or a computing device with a wireless communication function or another processing device, a vehicle-mounted device, or a wearable device connected to a radio modem, a terminal device in a 5G network or a terminal device in a future evolution public land mobile network (public land mobile network, PLMN), or the like.

The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on a body or integrated into clothes or an accessory of a user. The wearable device is not only a hardware device, but moreover implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

It should be understood that, a specific form of the terminal device is not limited in this application.

This application proposes that the network device provides, on a network side, the terminal device with a compensation amount for a frequency offset of a beam, so that during beam handover, the terminal device can calculate, based on the compensation amount indicated by the network device, a transmit frequency or a receive frequency of a beam to which the terminal device is handed over.

The following describes in detail the embodiments provided in this application with reference to the accompanying drawings.

Figure 2:
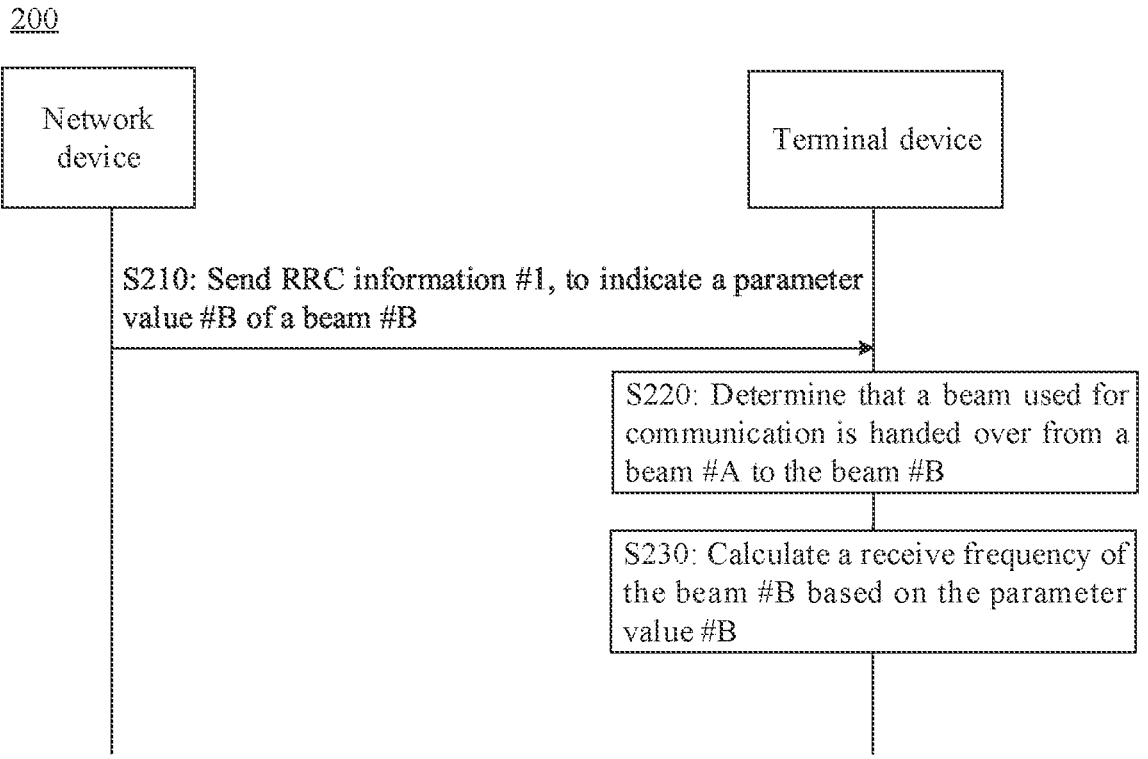
FIG. 2 is a flowchart of an example of a beam handover method according to an embodiment of this application.

FIG. 2 is a schematic flowchart of a beam handover method according to an embodiment of this application.

S210: A network device sends indication information #1 (namely, an example of first indication information) to a terminal device, where the indication information #1 is used to indicate a parameter value #B (namely, an example of a first parameter value) of a beam #B (namely, an example of a first beam).

S220: The terminal device determines that a beam used by the terminal device to communicate with the network device is handed over from a beam #A (namely, an example of a second beam) to the beam #B.

S230: The terminal device calculates a receive frequency of the beam #B based on the parameter value #B.

The terminal device is connected to the network device. In S210, the network device notifies the terminal device of the parameter #B of the beam #B by using the indication information #1, and the parameter value #B is a compensation amount of a frequency offset that is of the beam #B and that is generated by relative motion between the terminal device and the network device. The parameter #B may further be a compensation amount implemented by the network device for the beam #B. For example, the network device notifies the terminal device of a pre-compensation amount implemented by a network side for a downlink beam, that is, notifies an example of the parameter value #B, so that the terminal device can calculate a receive frequency of the downlink beam by determining the pre-compensation amount implemented by the network device for the downlink beam. For another example, the network device notifies the terminal device of a post-compensation amount implemented by the network side for a transmit beam (namely, an uplink beam) of the terminal device, that is, notifies another example of the parameter value #B, so that the terminal device can calculate a transmit frequency of the uplink beam by determining the pre-compensation amount implemented by the network device for the uplink beam. The beam #B to which the terminal device is to be handed over may be a beam of a current serving cell of the terminal device, or may be a beam of a cell other than the serving cell. For example, the network device indicates a parameter value #B of a beam #B of another cell by using the indication information #1, so that when the terminal device is handed over to the beam #B of the another cell, a receive frequency of the beam #B can be calculated based on the parameter value #B.

According to the solution of this application, the network device notifies the terminal device of a frequency compensation value of a beam, so that the terminal device can determine a receive frequency or a transmit frequency of the beam, thereby avoiding communication interruption caused by inter-beam frequency hopping after beam handover, and improving communication reliability. The frequency compensation value is a compensation amount for a frequency offset that is caused when the terminal device is handed over to a satellite beam to which the terminal device is to be handed over.

Optionally, the indication information #1 is carried in a broadcast message or a radio resource control (radio resource control, RRC) message.

By way of example instead of limitation, the broadcast message may include but is not limited to one or more of the following information:

a master information block (master information block, MIB), a system information block (system information block, SIB), downlink control information (Downlink control information, DCI), and a MAC control element (MAC control element, MAC-CE).

By way of example instead of limitation, the indication information #1 is carried in bandwidth part configuration information, and the bandwidth part information may include but is not limited to the following forms.

Form 1: The bandwidth part information is configuration information used to configure a general parameter for a bandwidth part.

For example, the bandwidth part information is "BWP", and the BWP information includes but is not limited to one or more of the following information elements:

a "locationAndBandwidth" information element used to configure a start location and a bandwidth frequency domain width of the bandwidth;

a "subcarrierSpacing" information element used to configure a subcarrier spacing of the bandwidth;

a "cyclicPrefix" information element used to configure a cyclic prefix of the bandwidth; and indication information #1 used to configure the parameter value #B.

An information element name of the indication information #1 may be "dlDopplerPreCompensationList", and a format of the BWP information may be represented in the following format. However, this is not limited in this application.

```
BWP ::=                          SEQUENCE {
    locationAndBandwidth          INTEGER (0..37949),
    subcarrierSpacing             SubcarrierSpacing,
    cyclicPrefix                  ENUMFRATED { extended }
    dlDopplerPreCompensationList
    DlDopplerPreCompensationValueList
}
```

Form 2: The bandwidth part configuration information is configuration information used to configure a cell-specific common parameter for a bandwidth part.

For example, when the beam #B is a downlink beam, the bandwidth part configuration information is "BWP-DownlinkCommon", and the BWP-DownlinkCommon information includes but is not limited to one or more of the following information elements:

a "genericParameter" information element used to configure a general parameter;

a "PDCCH-ConfigCommon" information element used to configure a parameter of a cell-specific downlink control channel;

a "PDSCH-ConfigCommon" information element used to configure a parameter of a cell-specific downlink shared channel; and indication information #1 used to configure the parameter value #B.

An information element name of the indication information #1 may be "dlDopplerPreCompensationList", and a format of the BWP-DownlinkCommon information may be represented as follows. However, this is not limited in this application.

```
BWP-DownlinkCommon ::=        SEQUENCE {
    genericParameters          BWP,
    pdcch-ConfigCommon         SetupRelease { PDCCH-ConfigCommon }
    pdsch-ConfigCommon         SetupRelease { PDSCH-ConfigCommon }
    dlDopplerPreCompensationList
DlDopplerPreCompensationValueList

...
}
```

For another example, when the beam #B is an uplink beam, the bandwidth part configuration information is "BWP-UplinkCommon", and the "BWP-UplinkCommon" information includes but is not limited to one or more of the following information elements:

a "genericParameter" information element used to configure a general parameter;

a "rach-ConfigCommon" information element used to configure a cell-specific random access channel;

a "pusch-ConfigCommon" information element and a "pusch-ConfigCommon" information element used to configure a cell-specific uplink shared channel and an uplink control channel; and indication information #1 used to configure the parameter value #B.

An information element name of the indication information #1 may be "ulDopplerPostCompensationValueList", and a format of the BWP-UplinkCommon information may be represented as follows. However, this is not limited in this application.

```
BWP-UplinkCommon ::=         SEQUENCE {
    genericParameters    BWP,
    rach-ConfigCommon        SetupRelease { RACH-ConfigCommon }
    pusch-ConfigCommon       SetupRelease { PUSCH-ConfigCommon }
    pucch-ConfigCommon       SetupRelease { PUCCH-ConfigCommon }
    ulDopplerPostCompensationValueList
UlDopplerPostCompensationValueList
```

Form 3: The bandwidth part configuration information is configuration information used to configure a common parameter for a bandwidth part group in a cell.

For example, bandwidth parts in the cell are divided into one or more bandwidth part groups. The bandwidth part configuration information is used to configure common information of a bandwidth part group. The indication information #1 is carried in a configuration parameter used to configure the common information of the bandwidth part group. That is, a parameter value of a beam corresponding to a bandwidth part group is the same.

In an implementation, when the beam #B is a downlink beam, the bandwidth part configuration information is "BWP Group", and an information element name of the indication information #1 may be "dlDopplerPreCompensationList". Optionally, the BWP Group further includes an identifier "BWP group ID" of the BWP Group, and a format of the BWP Group information may be represented as follows. However, this is not limited in this application.

```
BWP Group ::=                    SEQUENCE {
    BWP group ID                     bwp group ID,
    dlDopplerPreCompensationList
DlDopplerPreCompensationValueList

...
}
```

In another implementation, when the beam #B is an uplink beam, the bandwidth part configuration information is "BWP Group", and an information element name of the indication information #1 may be "ulDopplerPostCompensationList". Optionally, the BWP Group further includes an identifier "BWP group ID" of the BWP Group, and a format of the BWP Group information may be represented as follows. However, this is not limited in this application.

```
BWP Group ::=                    SEQUENCE {
    BWP group ID                     bwp group ID,
    ulDopplerPostCompensationList
UlDopplerPostCompensationValueList

...
}
```

In another implementation, one bandwidth part group may correspond to both an uplink beam and a downlink beam. That is, when the bandwidth part group is configured as a downlink bandwidth part group for carrying downlink data, a downlink parameter value is used, and when the bandwidth part group is configured as an uplink bandwidth part group for carrying uplink data, a downlink parameter value is adopted. A format of the BWP Group information may be represented as follows. However, this is not limited in this application.

```
BWP Group ::=                    SEQUENCE {
    BWP group ID                     bwp group ID,
    ulDopplerPostCompensationList
UlDopplerPostCompensationValueList
    dlDopplerPreCompensationList
DlDopplerPreCompensationValueList

...
}
```

Form 4: The bandwidth part configuration information is configuration information used to configure a UE-specific parameter for a bandwidth part.

For example, when the beam #B is a downlink beam used by the terminal device to receive downlink data or signaling, the bandwidth part configuration information is "BWP-DownlinkDedicated", and the BWP-DownlinkDedicated information includes but is not limited to one or more of the following information elements:

a "pdcch-Config" information element used to configure a parameter of a terminal device-specific downlink control channel;

a "pdsch-Config" information element used to configure a parameter of a terminal device-specific downlink shared channel;

an "sps-Config" information element used to configure semi-persistent scheduling; and indication information #1 used to configure the parameter value #B.

An information element name of the indication information #1 may be "dlDopplerPreCompensationList", and a format of the BWP-DownlinkDedicated information may be represented in the following format. However, this is not limited in this application.

```
BWP-DownlinkDedicated::=            SEQUENCE {
    pdcch-Config                       SetupRelease { PDCCH-Config }
    pdsch-Config                       SetupRelease { PDSCH-Config }
    sps-Config                         SetupRelease { SPS-Config }
    radioLinkMonitoringConfig                            SetupRelease
{ RadioLinkMonitoringConfig }
    dlDopplerPreCompensationList       DlDopplerPreCompensationValueList

...
}
```

For another example, when the beam #B is an uplink beam used by the terminal device to send uplink data or signaling, the bandwidth part configuration information is "BWP-UplinkDedicated", and the BWP-UplinkDedicated information includes but is not limited to one or more of the following information elements:

a "pucch-Config" information element used to configure a parameter of a terminal device-specific uplink control channel;

a "pusch-Config" information element used to configure a parameter of a terminal device-specific uplink shared channel;

an "sps-Config" information element used to configure semi-persistent scheduling;

a "configuredGrantConfig" information element used to configure grant free scheduling or grant scheduling; and indication information #1 used to configure the parameter value #B.

An information element name of the indication information #1 may be "ulDopplerPostCompensationList", and a format of the BWP-UplinkDedicated information may be represented in the following format. However, this is not limited in this application.

```
BWP-DownlinkDedicated::=            SEQUENCE {
    pucch-Config                   SetupRelease { PUCCH-Config }
    pusch-Config                   SetupRelease { PUSCH-Config }
    configuredGrantConfig          SetupRelease { ConfiguredGrantConfig }
    srs-Config                     SetupRelease { SRS-Config }
    beamFailureRecoveryConfig      SetupRelease { BeamFailureRecoveryConfig }
    ulDopplerPostCompensationList
UlDopplerPostCompensationValueList
    ...
}
```

In the foregoing three forms, the indication information #1 may indicate only the parameter value #B of the beam #B, or may indicate values of parameters of a plurality of beams, where the values include the parameter value #B of the beam #B.

Optionally, a quantity of beams indicated in the indication information #1 is equal to a quantity of beams corresponding to one bandwidth part. For example, data carried in the bandwidth part may be sent by using one or more beams, and the indication information #1 includes values of parameters of the one or more beams. When the network device sends the data carried in the bandwidth part to the terminal device by using the beam #B in the one or more beams, the terminal device calculates a receive frequency of the beam based on the parameter value of the beam in the indication information #1, to receive the data carried in the bandwidth part.

By way of example instead of limitation, the network device indicates the terminal device to be handed over to a beam and/or a bandwidth part by indicating the bandwidth part configuration.

In an implementation, the network device (for example, a satellite base station) sends bandwidth part configuration information #A to the terminal device, where the bandwidth configuration information #A includes a configured bandwidth part #A, the parameter value #B of the beam #B, and/or an identifier of the beam #B, and the bandwidth part configuration information #A is used to indicate the terminal device to be handed over to the bandwidth part #A and receive downlink data by using the beam #B. After receiving the bandwidth part configuration #A, the terminal device is handed over to the bandwidth part #A and calculates a receive frequency of the beam #A based on the parameter value #B to receive downlink data carried in the bandwidth part #A.

In the embodiments of this solution, the foregoing three forms may be separately implemented, or may be implemented in combination with each other. For example, Form 1 is combined with Form 2 or Form 3, when the bandwidth part is an initial bandwidth part, namely, a bandwidth resource that first performs communication after the terminal device accesses a cell, the indication information #1 is carried in the BWP information of Form 1, or when the bandwidth part is a bandwidth other than the initial bandwidth part, the indication information #1 is carried in BWP-DownlinkCommon in Form 2 or BWP-DownlinkDedicated in Form 3.

By way of example instead of limitation, the indication information #1 is carried in transmission configuration indicator (transmission configuration indicator, TCI) configuration information.

The transmission configuration indicator configuration information is used to configure a TCI state and configure a reference signal corresponding to the transmission configuration indicator state, so that the terminal device can determine a beam based on configuration of the TCI state and the reference signal in the transmission configuration indicator. The TCI configuration information carries the indication information #1, so that the terminal device can determine the parameter value #B when determining the beam #B. That is, the terminal device may determine the parameter value #B of the beam based on the indication information #1 in the TCI configuration when determining the beam #B based on the configuration of the TCI state and the reference signal.

For example, the TCI configuration information may be "tci-StatesToAddModList", where "tci-StateId" is used to configure a TCI state, "referenceSignal csi-rs" is used to configure a reference signal corresponding to the TCI state, and "DlDopplerPreCompensationValue" and "UlDopplerPostCompensationValue" are respectively used to configure a parameter value of a downlink beam and a parameter value of an uplink beam. A format of tci-StatesToAddModList may be represented as follows. However, this is not limited in this application.

```
tci-StatesToAddModList
{ tci-StateId X
    referenceSignal csi-rs Y
    DlDopplerPreCompensationValue      BIT STRING (SIZE (n)),
    UlDopplerPostCompensationValue     BIT STRING (SIZE (n)),
}
```

For another example, the TCI configuration information is used to configure a reference signal and configure a polarization direction of an antenna port of the reference signal. The terminal device determines a beam based on configuration of the reference signal and configuration of the polarization direction of the antenna port. The TCI configuration information carries the indication information #1, so that the terminal device can determine the parameter value #B when determining the beam #B. That is, the terminal device may determine the parameter value #B of the beam based on the indication information #1 in the TCI configuration when determining the beam #B based on the configuration of the polarization direction of the antenna port and the configuration of the reference signal. "DlDopplerPreCompensationValue" and "UlDopplerPostCompensationValue" are respectively used to configure a parameter value of a downlink beam and a parameter value of an uplink beam. "DlDopplerPreCompensationValue" and "UlDopplerPostCompensationValue" are respectively used to configure a parameter value of a downlink beam and a parameter value of an uplink beam.

```
tci-StatesToAddModList {
    Polarization direction X
    referenceSignal csi-rs Y
    DlDopplerPreCompensationValue      BIT STRING (SIZE (n)),
    UlDopplerPostCompensationValue     BIT STRING (SIZE (n)),
}
```

For another example, the TC configuration information further includes QCL type configuration "qcl-Type" and/or identifier configuration "bwp-Id 0" of a bandwidth part.

```
tci-StatesToAddModList {
    tci-StateId X,
        {qcl-Type1
            { bwp-Id 0,
                Polarization direction 0,
                reference Signal csi-rs : 0,
                qcl-Type typeA
            }
        }
        {qcl-Type2
            { bwp-Id 0,
                Polarization direction 0,
                referenceSignal csi-rs : 0,
                qcl-Type typeA
            }
        }
        DlDopplerPreCompensationValue        BIT STRING (SIZE (n)),
        UlDopplerPostCompensationValue       BIT STRING (SIZE (n)),
        dopplerCompensationFactor            BIT STRING (SIZE (n)),
},
```

By way of example instead of limitation, the indication information #1 is carried in measurement configuration information.

For example, the measurement configuration information is "MeasObjectNR" used to measure an intra-frequency/inter-frequency synchronization signal, and/or to measure an intra-frequency/inter-frequency channel state reference signal, and the MeasObjectNR information includes but is not limited to one or more of the following information elements:

an "ssbFrequency" information element used to configure a frequency of a synchronization signal;

an "ssbSubcarrierSpacing" information element used to configure a subcarrier spacing of the synchronization signal;

an "smtc1" information element used to configure measurement time information; and indication information #1 used to configure the parameter value #B.

An information element name of the indication information #1 may be "dlDopplerPreCompensationValue", and the indication information #1 is used to configure a parameter value of a downlink beam. A format of the MeasObjectNR information may be represented in the following format. However, this is not limited in this application.

```
MeasObjectNR ::=                 SEQUENCE {
    ssbFrequency                     ARFCN-ValueNR
    dopplerCompensationValue         DlDopplerPreCompensationValue
    ssbSubcarrierSpacing             SubcarrierSpacing
    smtc1                            SSB-MTC
    ...
}
```

Optionally, the measurement configuration information may further include information used to configure a parameter value of an uplink beam.

For example, an information element that configures a parameter value of a downlink beam is "DlDopplerPreCompensationValue", and an information element that is used to configure a parameter value of an uplink beam is "UlDopplerPostCompensationValue". The configuration information may be further represented as:

```
MeasObjectNR ::=                    SEQUENCE {
    ssbFrequency                        ARFCN-ValueNR
        dopplerCompensationValue            CHOICE {
            DlDopplerPreCompensationValue
            UlDopplerPostCompensationValue
    }
        ssbSubcarrierSpacing                SubcarrierSpacing
        smtc1                               SSB-MTC
    ...
}
```

By way of example instead of limitation, when the beam #B is a beam of a cell other than a current serving cell, the parameter value #B of the beam #B is configured in the measurement configuration information.

By way of example instead of limitation, when the terminal device is handed over to a downlink beam outside a cell, a parameter value of an uplink beam is determined by using RRC reconfiguration information. For example, the RRC reconfiguration message is "RRCReconfiguration-IEs", and includes a "dopplerCompensationValue" information element used to configure a parameter value of an uplink beam. Optionally, the reconfiguration message may further include "radioBearerConfig" used to configure a radio resource bearer. A format of the RRC reconfiguration message may be represented as follows. However, this is not limited in this application.

```
RRCReconfiguration-IEs ::=       SEQUENCE {
    radioBearerConfig                RadioBearerConfig
    dopplerCompensationValue         UlDopplerPostCompensationValue
}
```

By way of example instead of limitation, the indication information #1 is pre-configuration information.

The network device may send the indication information #1 to the terminal device after the terminal device establishes a connection, that is, the indication information #1 is one piece of pre-configuration information. When a serving beam of the terminal device needs to be handed over, a receive frequency of the beam #B is calculated based on a parameter #B of a pre-configured beam #B.

By way of example instead of limitation, after it is determined that the terminal device is to be handed over to the beam #B, the network device sends the indication information #1 to the terminal device to indicate that a target beam to which the terminal device is handed over is the parameter value #B of the beam #B.

In an implementation, the network device, for example, a satellite base station, indicates the terminal device to be handed over to the beam #B, and notifies the terminal device of the parameter value #B of the beam #B by using the indication information #1, so that the terminal device is handed over to the beam #B based on the indication, and calculates the receive frequency of the beam #B.

In another implementation, if it is determined that the terminal device is to be handed over to the beam #B (for example, if it is determined, after measurement, that quality of the beam #B is higher than quality of a current serving beam, the terminal device decides to be handed over to the beam #B), the terminal device notifies the satellite base station of the beam #B to which the terminal device is to be handed over. After receiving the indication that the terminal device is to be handed over to the beam #B, the satellite base station sends the indication information #1 to the terminal device to indicate the parameter value #B of the beam #B, so that the terminal device calculates the receive frequency of the beam #B.

Optionally, the indication information #1 further includes an identifier of the beam #B.

For example, the indication information #1 is a "DlDopplerPreCompensationValue" information element, and a format of the information element may be represented as follows:

```
DlDopplerPreCompensationValue::=    SEQUENCE {
    beamId                          BIT STRING (SIZE (n)),
    compensationValue               BIT STRING (SIZE (n)),
}
```

By way of example instead of limitation, the indication information #1 may be indicated in the following two manners.

Manner 1: The indication information #1 indicates a normalized value of the parameter value #B.

By way of example instead of limitation, the normalized value is a simplified value of the parameter value #B.

The indication information #1 may notify the terminal device of the parameter value #B of the beam #B by indicating the simplified value of the parameter value #B, to reduce signaling overheads when indication precision for the parameter value is ensured.

By way of example instead of limitation, after receiving the normalized value that is of the parameter value #B and that is indicated by the indication information #1, the terminal device first recovers a value of the parameter value #B based on the normalized value, and calculates the receive frequency of the beam #B based on the parameter value #B.

By way of example instead of limitation, the normalized value of the parameter value #B is calculated by using the parameter value #B, a normalization factor, and a multiple factor.

In this application, the network device may calculate the parameter value #B by using the parameter value #B, the normalization factor, and the multiple factor, and then notifies the terminal device of the normalized value by using the indication information #1. After receiving the indication information #1, the terminal device restores the parameter value #B based on the normalized value of the parameter value #B, the normalization factor, and the multiple factor, and then calculates the receive frequency of the beam #B.

By way of example instead of limitation, the normalized value of the parameter value #B is obtained by using the following calculation formula:

$$f_{p\_compressed}=F(f_p/f_{compress} \times \alpha)$$

$f_p$ is the parameter value #B, $f_{compress}$ is a compression factor, $f_{p\_compressed}$ is a compressed value of the parameter value #B, $\alpha$ is the multiple factor, and $F(x)$ is used to obtain a round-off value of A.

By way of example instead of limitation, the normalized value of the parameter value #B is obtained by using the following calculation formula:

$$f_{compress}=f_{p\_int}+f_{p\_dec},$$

An integer part of $f_{compress}$ is: $f_{p\_int}=\text{floor}(f_p/f_{compress})$; and a decimal part of $f_{compress}$ is:

$$f_{p\_dec}=\text{round}(f_p/f_{compress}-\text{floor}(f_p/f_{compress}) \times \alpha).$$

floor(x) represents rounding down x, and round(x) represents a round-off value. For example, the indication information #1 includes totally 10 bits, where higher 5 bits correspond to the integer part of $f_{compress}$, and lower 5 bits correspond to the decimal part of $f_{compress}$.

By way of example instead of limitation, the normalization factor is a center frequency or a subcarrier spacing of the beam #B.

The subcarrier spacing may be a subcarrier spacing of an initial bandwidth part, or may be a subcarrier spacing related to the beam #B. This is not limited in this application.

By way of example instead of limitation, the multiple factor $\alpha$ may be preset by a system or specified in a protocol.

By way of example instead of limitation, a value range of a parameter value corresponds to a multiple factor $\alpha$.

For example, a parameter value of 0 kHz to 10 kHz corresponds to $\alpha_1$, and a parameter value of 10 kHz to 20 kHz corresponds to $\alpha_2$. The network device or the terminal device determines a value of a based on a value range in which a value of the parameter value falls.

By way of example instead of limitation, configuration information that is delivered by the network device and that carries the indication information #1 further includes an information element used to indicate the multiple factor $\alpha$.

For example, an information element "dopplerCompensationFactorList" is used to indicate the multiple factor $\alpha$. When the indication information #1 is carried in bandwidth part configuration information that is used to configure a general parameter for a bandwidth part, for example, the bandwidth part configuration information is "BWP", the information is as follows:

```
BWP ::=                           SEQUENCE {
    locationAndBandwidth          INTEGER (0..37949),
    subcarrierSpacing             SubcarrierSpacing,
    cyclicPrefix                  ENUMERATED { extended }
    dlDopplerPreCompensationList  DlDopplerPreCompensationValue-
                                  List
    dopplerCompensationFactorList    DopplerCompensationFactorList
}
```

For example, an information element "dopplerCompensationFactor" is used to indicate the multiple factor $\alpha$. When the indication information #1 is carried in measurement configuration information, for example, the measurement configuration information is MeasObjectNR, the information is as follows:

```
MeasObjectNR ::=                  SEQUENCE {
    ssbFrequency                  ARFCN-ValueNR
    dopplerCompensationValue      DlDopplerPreCompensationValue
    dopplerCompensationFactor     DopplerCompensationFactor
    ssbSubcarrierSpacing          SubcarrierSpacing
    smtc1                         SSB-MTC
    ...
}
```

In the solution of this embodiment, configuration information that includes the information element used to indicate the multiple factor $\alpha$ may be alternatively the configuration information in Form 2 or Form 3. This is not limited in this application.

Manner 2: The indication information #1 specifically indicates an index value of the parameter value #B.

For example, one or more parameter values are preset by a system or specified in a protocol, where each parameter value in the one or more parameter values corresponds to one index value, the parameter value is a frequency compensation value, and a correspondence between the one or more frequency compensation values and one or more index values may be represented in the following form in Table 1:

TABLE 1

| Frequency compensation value index table | |
| --- | --- |
| Index value | Frequency compensation value |
| 1 | 27 kHz |
| 2 | 18 kHz |
| . . . | . . . |

Manner 3: The indication information #1 specifically indicates an identifier of the beam #B and/or an identifier of a cell to which the beam #B belongs. The terminal device obtains the parameter value #B by querying a table based on the identifier of the beam #B and/or the identifier of the cell to which the beam #B belongs.

By way of example instead of limitation, a parameter value table is preset by a system or specified in a protocol, and in the table, a parameter value of a beam may be determined by using an identifier of the beam and/or an identifier of a cell to which the beam belongs.

For example, the parameter value is a frequency compensation value, and a correspondence between the frequency compensation value and both of the identifier of the beam and an identifier index value of the cell to which the beam belongs may be represented in the following form in Table 2:

TABLE 2

| Frequency compensation value index table Identifier of a cell | |
| --- | --- |
| Identifier of a beam | Frequency compensation value |
| 1 | 27 kHz |
| 2 | 18 kHz |
| . . . | . . . |

By way of example instead of limitation, a parameter value table is preset by a system or specified in a protocol, and in the table, a compressed value of a parameter value of a beam may be determined by using an identifier of the beam and/or an identifier of a cell to which the beam belongs.

Optionally, in the parameter value table, a multiple factor may be further determined by using an identifier of a beam and/or an identifier of a cell to which the beam belongs.

For example, the parameter value is a frequency compensation value, and a correspondence between both of the frequency compensation value and the multiple factor and both of the identifier of the beam and the identifier of the cell to which the beam belongs may be represented in the following form in Table 3:

TABLE 3

| Frequency compensation compressed value and multiple factor index table Identifier of a cell | | |
| --- | --- | --- |
| Identifier of a beam | Frequency compensation value | Multiple factor |
| 1 | 1001 | 110 |
| 2 | 1011 | 001 |
| . . . | . . . | . . . |

In S230, the terminal device calculates the receive frequency of the beam #B based on the parameter value #B.

In an implementation, the terminal device adds the center frequency of beam #B to the parameter value #B to obtain a value, and the value is the receive frequency of beam #B.

The parameter value #B indicated by the network device is a frequency offset value of frequency compensation that needs to be performed on the beam #B. The terminal device adds the parameter value #B to the center frequency of the beam #B to obtain the receive frequency of the beam #B.

In another implementation, the terminal device determines the receive frequency of the beam #B based on a parameter value #A (namely, an example of a second parameter value) of the current serving beam, namely, the beam #A, and based on the parameter value #B.

In this solution, the parameter value #A and the parameter value #B are parameter values that are separately used by the network side to perform frequency pre-compensation on the beam #A and the beam #B.

By way of example instead of limitation, the receive frequency $f_r$ of the beam #B may be calculated based on the following formula.

$$f_r = (f_2 + f_{p2})\left(1 + \frac{f_{d1}}{f_1 + f_{p1}}\right)$$

$f_1$ and $f_2$ are respectively center frequencies of the beam #A and the beam #B, $f_{p1}$ and $f_{p2}$ are respectively the parameter value #A and the parameter value #B, and $f_{d1}$ is a frequency offset residual value of the beam #A at a location of the terminal device.

By way of example instead of limitation, the network device further sends indication information #2 (namely, an example of second indication information) to the terminal device, where the indication information #2 is used to indicate the parameter value #A of the beam #A.

In this solution, for an indication form and indication content of the indication information #2, refer to descriptions in the indication information #1. For brevity, details are not described herein again.

By way of example instead of limitation, the indication information #1 and the indication information #2 are carried in different configuration information.

For example, the indication information #1 is carried in the bandwidth part configuration information #A, and the indication information #2 is carried in bandwidth part configuration information #B.

By way of example instead of limitation, the indication information #1 and the indication information #2 are carried in same configuration information.

For example, the measurement configuration information sent by the network device to the terminal device includes the indication information #1 and the indication information #2.

It should be understood that sequence numbers of the processes do not mean execution sequences in the foregoing embodiments. The execution sequences of the processes should be determined based on functions and internal logic of the processes, and should not constitute any limitation on the implementation processes in the embodiments of this application.

The foregoing describes in detail the method provided in the embodiments of this application with reference to FIG.

2. The following describes in detail the apparatuses provided in the embodiments of this application with reference to FIG. 3 to FIG. 5.

Figure 3:
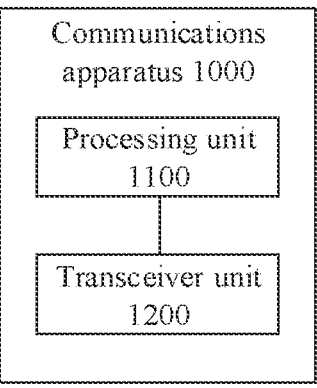
FIG. 3 is a schematic block diagram of an example of a wireless communications apparatus applicable to an embodiment of this application.

FIG. 3 is a schematic block diagram of a communications apparatus according to an embodiment of this application. As shown in FIG. 3, the communications apparatus 1000 may include a processing unit 1100 and a transceiver unit 1200.

In a possible design, the communications apparatus 1000 may correspond to the terminal device in the foregoing method embodiments, for example, may be the terminal device, or may be a chip disposed in the terminal device.

It should be understood that the communications apparatus 1000 may correspond to the terminal device in the method 500 according to the embodiments of this application, and the communications apparatus 1000 may include units configured to perform the method performed by the terminal device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the transceiver unit 1200 may be configured to perform S210 in the method 200, and the processing unit 1100 may be configured to perform S220 and S230 in the method 200. It should be understood that, a specific process in which each unit performs the foregoing corresponding step has been described in detail in the foregoing method embodiments. For brevity, details are not described herein again.

Figure 4:
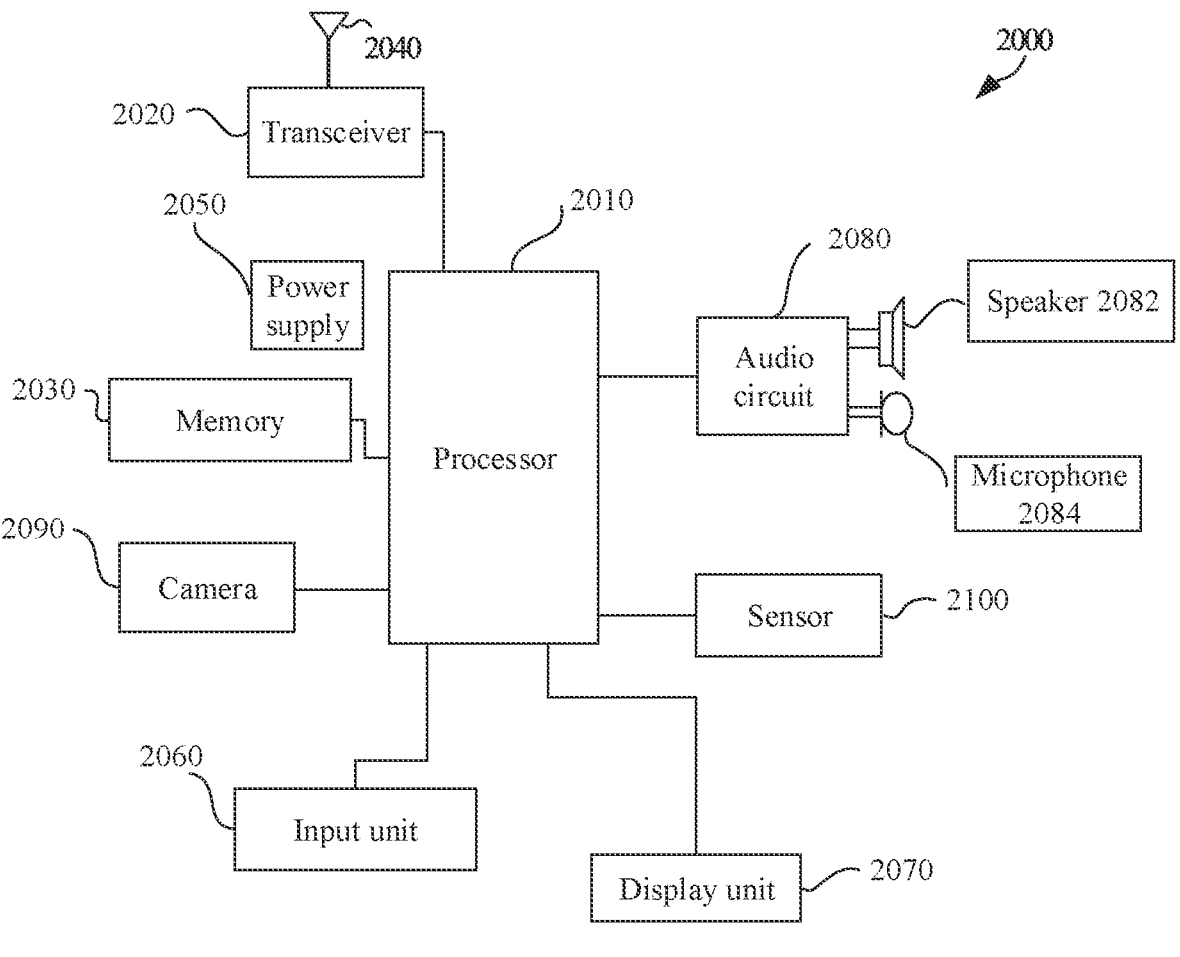
FIG. 4 is a schematic diagram of an example of a structure of a terminal device applicable to an embodiment of this application.

It should be further understood that, when the communications apparatus 1000 is the terminal device, the transceiver unit 1200 in the communications apparatus 1000 may correspond to a transceiver 2020 in a terminal device 2000 shown in FIG. 4, and the processing unit 1100 in the communications apparatus 1100 may correspond to a processor 2010 in the terminal device 2000 shown in FIG. 4.

It should also be understood that, when the communications apparatus 1000 is a terminal device, the transceiver unit 1200 in the communications apparatus 1000 may be implemented through a communications interface (for example, a transceiver or an input/output interface). For example, the transceiver unit 1200 may correspond to a transceiver 2020 in a terminal device 2000 shown in FIG. 4. The processing unit 1100 in the communications apparatus 1000 may be implemented by using at least one processor. For example, the processing unit 1100 may correspond to a processor 2010 in the terminal device 2000 shown in FIG. 4. The processing unit 1100 in the communications apparatus 1000 may be alternatively implemented by using at least one logic circuit.

Optionally, the communications apparatus 1000 may further include a processing unit 1100, and the processing unit 1100 may be configured to process instructions or data, to implement a corresponding operation.

Optionally, the communications apparatus 1000 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

In another possible design, the communications apparatus 1000 may correspond to the network device in the foregoing method embodiments, for example, may be the network device, or may be a chip disposed in the network device.

It should be understood that the communications apparatus 1000 may correspond to the network device in the method 200 according to the embodiments of this application, and the communications apparatus 1000 may include units configured to perform the method performed by the network device in the method 200 in FIG. 2. In addition, the units in the communications apparatus 1000 and the foregoing other operations and/or functions are separately used to implement corresponding procedures of the method 200 in FIG. 2.

When the communications apparatus 1000 is configured to perform the method 200 in FIG. 2, the transceiver unit 1200 may be configured to perform S210 in the method 200. It should be understood that, a specific process in which each unit performs the foregoing corresponding step has been described in detail in the foregoing method embodiments. For brevity, details are not described herein again.

Figure 5:
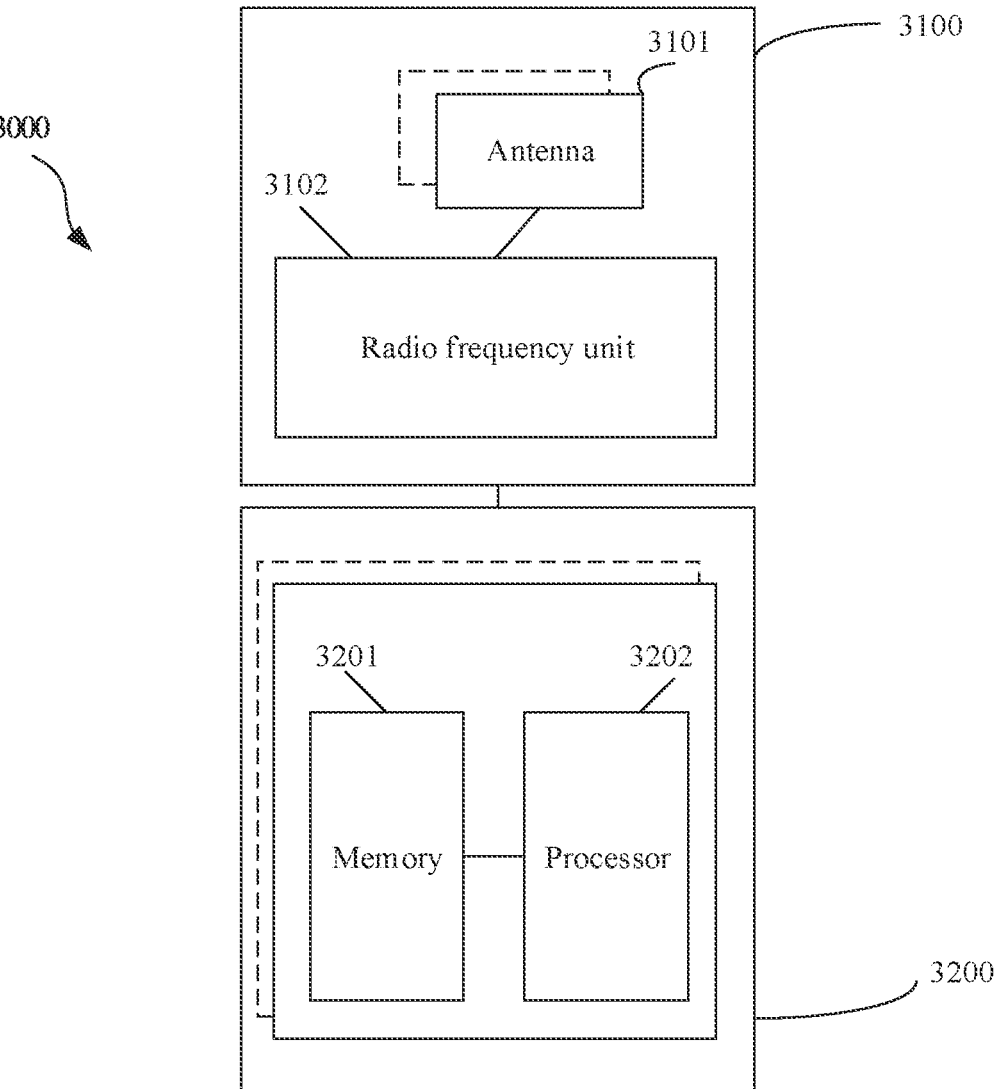
FIG. 5 is a schematic diagram of an example of a structure of a network device applicable to an embodiment of this application.

It should be further understood that, when the communications apparatus 1000 is the network device, the transceiver unit in the communications apparatus 1000 may correspond to a transceiver 3100 in a network device 3000 shown in FIG. 5, and the processing unit 1100 in the communications apparatus 1000 may correspond to a processor 3202 in the network device 3000 shown in FIG. 5.

Optionally, the communications apparatus 1000 may further include a processing unit 1100, and the processing unit 1100 may be configured to process instructions or data, to implement a corresponding operation.

Optionally, the communications apparatus 1000 may further include a storage unit. The storage unit may be configured to store instructions or data. The processing unit may invoke the instructions or the data stored in the storage unit, to implement a corresponding operation.

It should be understood that, a specific process in which each unit performs the foregoing corresponding step has been described in detail in the foregoing method embodiments. For brevity, details are not described herein again.

It should also be understood that, when the communications apparatus 1000 is a network device, the transceiver unit 1200 in the communications apparatus 1000 may be implemented through a communications interface (for example, a transceiver or an input/output interface). For example, the transceiver unit 1200 may correspond to a transceiver 3100 in a network device 3000 shown in FIG. 5. The processing unit 1100 in the communications apparatus 1000 may be implemented by using at least one processor. For example, the processing unit 1100 may correspond to a processor 3202 in the network device 3000 shown in FIG. 5. The processing unit 1100 in the communications apparatus 1000 may be alternatively implemented by using at least one logic circuit.

FIG. 4 is a schematic diagram of a structure of a terminal device 2000 according to an embodiment of this application. The terminal device 2000 may be used in the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 may communicate with each other through an internal connection path, to transfer a control signal and/or a data signal. The memory 2030 is configured to store a computer program. The processor 2010 is configured to invoke the computer program from the memory 2030 and run the computer program, to control the transceiver 2020 to send and receive a signal. Optionally, the terminal device 2000 may further include an antenna 2040, configured to send, by using a radio signal, uplink data or uplink control signaling output by the transceiver 2020.

The processor 2010 and the memory 2030 may be integrated into one processing apparatus. The processor 2010 is configured to execute program code stored in the memory 2030 to implement the foregoing functions. During specific implementation, the memory 2030 may alternatively be integrated into the processor 2010, or may be independent of the processor 2010. The processor 2010 may correspond to the processing unit in FIG. 3.

The transceiver 2020 may correspond to the transceiver unit in FIG. 3. The transceiver 2020 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that, the terminal device 2000 shown in FIG. 4 can implement the processes of the terminal device in the method embodiment shown in FIG. 2. Operations and/or functions of the modules in the terminal device 2000 are separately intended to implement corresponding procedures in the foregoing method embodiments. For details, refer to the descriptions in the foregoing method embodiments. To avoid repetition, detailed descriptions are properly omitted herein.

The processor 2010 may be configured to perform an action that is implemented inside the terminal device and that is described in the foregoing method embodiments, and the transceiver 2020 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 2000 may further include a power supply 2050, configured to supply power to various devices or circuits in the terminal device.

In addition, to improve the functions of the terminal device, the terminal device 2000 may further include one or more of an input unit 2060, a display unit 2070, an audio circuit 2080, a camera 2090, a sensor 2100, and the like, and the audio circuit may further include a speaker 2082, a microphone 2084, and the like.

FIG. 5 is a schematic diagram of a structure of a network device according to an embodiment of this application, for example, may be a schematic diagram of a related structure of a satellite.

It should be understood that, the satellite 3000 shown in FIG. 5 can implement the processes of the network device in the method embodiment in FIG. 2. Operations and/or functions of the modules in the satellite 3000 are separately intended to implement corresponding procedures in the foregoing method embodiments. For details, refer to the descriptions in the foregoing method embodiments. To avoid repetition, detailed descriptions are properly omitted herein.

It should be understood that, the satellite 3000 shown in FIG. 5 is merely a possible architecture of the network device, and shall not constitute any limitation on this application. The method provided in this application is applicable to a network device of another architecture, for example, a network device including a CU, a DU, and an AAU. A specific architecture of the network device is not limited in this application.

An embodiment of this application further provides a processing apparatus, including a processor and an interface. The processor is configured to perform the method in any one of the foregoing method embodiments.

It should be understood that the processing apparatus may be one or more chips. For example, the processing apparatus may be a field programmable gate array (field programmable gate array, FPGA), an application-specific integrated circuit (application specific integrated circuit, ASIC), a system on chip (system on chip, SoC), a central processing unit (central processor unit, CPU), a network processor (network processor, NP), a digital signal processing circuit (digital signal processor, DSP), a micro controller unit (micro controller unit, MCU), or a programmable logic device (programmable logic device, PLD) or another integrated chip.

In an implementation process, steps in the foregoing methods can be implemented by using a hardware integrated logic circuit in the processor, or by using instructions in a form of software. The steps of the methods disclosed with reference to the embodiments of this application may be directly executed and accomplished by a hardware processor, or may be executed and accomplished by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, steps in the foregoing method embodiments may be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps of the methods disclosed with reference to the embodiments of this application may be directly executed and accomplished by a hardware decoding processor, or may be executed and accomplished by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory in the system and method described in this specification includes but is not limited to these memories and any memory of another suitable type.

According to the methods provided in the embodiments of this application, this application further provides a computer program product, and the computer program product includes computer program code. When the computer program code is run on a computer, the computer is enabled to perform the method in the embodiment shown in FIG. 5.

According to the methods provided in the embodiments of this application, this application further provides a computer-readable medium. The computer-readable medium stores program code. When the program code is run on a computer, the computer is enabled to perform the method in the embodiment shown in FIG. 2, FIG. 5, or FIG. 5.

According to the methods provided in the embodiments of this application, this application further provides a system. The system includes the foregoing one or more terminal devices and the foregoing one or more network devices.

The network device and the terminal device in the foregoing apparatus embodiments completely correspond to the network device or the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disc, SSD)), or the like.

The network device and the terminal device in the foregoing apparatus embodiments completely correspond to the network device or the terminal device in the method embodiments. A corresponding module or unit performs a corresponding step. For example, the communication unit (the transceiver) performs a receiving or sending step in the method embodiments, and a step other than the sending or receiving step may be performed by the processing unit (the processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in the figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate, by using a local and/or remote process and based on, for example, a signal having one or more data packets (for example, data from two components interacting with another component in a local system, a distributed system, and/or across a network such as the internet interacting with another system by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units are integrated into one unit.

In the foregoing embodiments, all or some of the functions of the functional units may be implemented by software, hardware, firmware, or any combination thereof. When software is used to implement the functions, all or some of the functions may be implemented in a form of a computer program product. The computer program product includes one or more computer instructions (programs). When the computer program instructions (programs) are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A beam handover method, comprising:
receiving, by a terminal device, first indication information sent by a network device, wherein the first indication information is carried in bandwidth resource configuration information configuring a bandwidth, the first indication information comprises a first parameter value of a first beam used by the bandwidth, and the first parameter value is a compensation amount of a frequency offset of the first beam generated by relative motion between the terminal device and the network device; and
in response to a beam used by the terminal device to communicate with the network device being handed over from a second beam to the first beam, calculating, by the terminal device, a receive frequency or a transmit frequency of the first beam based on the first parameter value;
wherein the first indication information indicates a normalized value of the first parameter value; and
wherein the normalized value of the first parameter value is calculated by using the first parameter value, a normalization factor, and a multiple factor, and the normalized value is expressed as:
$f_{p\_compressed} = F(f_p/f_{compress} \times \alpha)$, wherein $f_p$ is the first parameter value, $f_{compress}$ is the normalization factor, $f_{p\_compressed}$ is the normalized value of the first parameter value, $\alpha$ is the multiple factor, and $F(x)$ represents rounding x.

2. The method according to claim 1, wherein the bandwidth resource configuration information is configuration information used to configure a general parameter for a bandwidth part.

3. The method according to claim 1, wherein the bandwidth resource configuration information is configuration information used to configure a cell-specific common parameter for a bandwidth part.

4. The method according to claim 1, wherein the bandwidth resource configuration information is configuration information used to configure a UE-specific parameter for a bandwidth part.

5. The method according to claim 1, wherein the first indication information indicates an index value of the first parameter value.

6. The method according to claim 1, wherein the first indication information further comprises information indicating the multiple factor $\alpha$.

7. The method according to claim 1, wherein the method further comprises:
receiving, by the terminal device, second indication information sent by the network device, wherein the second indication information indicates a second parameter value of the second beam; and
wherein the calculating, by the terminal device, a receive frequency or a transmit frequency of the first beam based on the first parameter value comprises:

calculating, by the terminal device, the receive frequency or the transmit frequency of the first beam based on the first parameter value and the second parameter value.

8. The method according to claim 1, wherein the method further comprises:

determining, by the terminal device, that the beam used by the terminal device to communicate with the network device is handed over from the second beam to the first beam.

9. A beam handover method, comprising:

determining, by a network device, a first parameter value, wherein the first parameter value is a compensation amount of a frequency offset of a first beam generated by relative motion between a terminal device and the network device; and sending, by the network device, first indication information to the terminal device, wherein the first indication information is carried in bandwidth resource configuration information configuring a bandwidth, the first indication information comprises the first parameter value of the first beam used by the bandwidth, and the first parameter value is used by the terminal device to calculate a receive frequency or a transmit frequency of the first beam in response to a beam used by the terminal device to communicate with the network device being handed over from a second beam to the first beam;

wherein the first indication information indicates a normalized value of the first parameter value; and wherein the normalized value of the first parameter value is calculated by using the first parameter value, a normalization factor, and a multiple factor, and the normalized value is expressed as:

$f_{p\_compressed}=F(f_p/f_{compress}\times\alpha)$, wherein $f_p$ is the first parameter value, $f_{compress}$ is the normalization factor, $f_{p\_compressed}$ is the normalized value of the first parameter value, $\alpha$ is the multiple factor, and F(x) represents rounding x.

10. The method according to claim 9, wherein the bandwidth resource configuration information is configuration information used to configure a general parameter for a bandwidth part.

11. The method according to claim 9, wherein the bandwidth resource configuration information is configuration information used to configure a cell-specific common parameter for a bandwidth part.

12. The method according to claim 9, wherein the bandwidth resource configuration information is configuration information used to configure a UE-specific parameter for a bandwidth part.

13. The method according to claim 9, wherein the first indication information indicates an index value of the first parameter value.

14. The method according to claim 9, wherein the first indication information further comprises information indicating the multiple factor $\alpha$.

15. A communications apparatus, comprising at least one processor and a memory, wherein the memory is coupled to the at least one processor and stores programming instructions for execution by the at least one processor to perform operations comprising:

receiving first indication information sent by a network device, wherein the first indication information is carried in bandwidth resource configuration information configuring a bandwidth, the first indication information comprises a first parameter value of a first beam used by the bandwidth, and the first parameter value is a compensation amount of a frequency offset of the first beam generated by relative motion between the communications apparatus and the network device; and in response to a beam used by the communications apparatus to communicate with the network device being handed over from a second beam to the first beam, calculating a receive frequency or a transmit frequency of the first beam based on the first parameter value;

wherein the first indication information indicates a normalized value of the first parameter value; and wherein the normalized value of the first parameter value is calculated by using the first parameter value, a normalization factor, and a multiple factor, and the normalized value is expressed as:

$f_{p\_compressed}=F(f_p/f_{compress}\times\alpha)$, wherein $f_p$ is the first parameter value, $f_{compress}$ is the normalization factor, $f_{p\_compressed}$ is the normalized value of the first parameter value, $\alpha$ is the multiple factor, and F(x) represents rounding x.

16. The apparatus according to claim 15, wherein the bandwidth resource configuration information is configuration information used to configure a general parameter for a bandwidth part.

17. The apparatus according to claim 15, wherein the bandwidth resource configuration information is configuration information used to configure a cell-specific common parameter for a bandwidth part.

18. The apparatus according to claim 15, wherein the bandwidth resource configuration information is configuration information used to configure a UE-specific parameter for a bandwidth part.

19. The apparatus according to claim 15, wherein the first indication information indicates an index value of the first parameter value.

20. The apparatus according to claim 15, wherein the first indication information further comprises information indicating the multiple factor $\alpha$.

* * * * *